US012700367B2

(12) United States Patent
Chappalli et al.

(10) Patent No.: US 12,700,367 B2
(45) Date of Patent: Aug. 4, 2026

(54) SYSTEMS AND METHODS FOR ADAPTIVE PEAK LUMINANCE CONTROL

(71) Applicant: Apple Inc., Cupertino, CA (US)

(72) Inventors: Mahesh B Chappalli, San Jose, CA (US); Alexey Kornienko, Watford (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/186,457

(22) Filed: Apr. 22, 2025

(65) Prior Publication Data

US 2026/0087982 A1 Mar. 26, 2026

Related U.S. Application Data

(60) Provisional application No. 63/699,720, filed on Sep. 26, 2024.

(51) Int. Cl.
*G09G 3/30* (2006.01)
*G09G 3/3233* (2016.01)

(52) U.S. Cl.
CPC ..... *G09G 3/3233* (2013.01); *G09G 2320/046* (2013.01); *G09G 2330/025* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 10,403,214 | B2 | 9/2019 | Baar | |
| 10,847,118 | B2 | 11/2020 | Baar | |
| 11,164,541 | B2 | 11/2021 | Holland | |
| 11,182,884 | B2 | 11/2021 | Deng | |
| 2007/0127569 | A1 * | 6/2007 | Hatalkar | G09G 5/00 375/240.26 |
| 2010/0123648 | A1 * | 5/2010 | Miller | G09G 3/3208 345/76 |
| 2024/0005890 | A1 | 1/2024 | Rim | |

FOREIGN PATENT DOCUMENTS

| | | | |
|---|---|---|---|
| CN | 116994526 | A | 11/2023 |
| JP | 2015219306 | A | 12/2015 |
| JP | 2016090939 | A | 5/2016 |
| KR | 02668226 | B1 | 5/2024 |

OTHER PUBLICATIONS

US 12,027,105 B1, 07/2024, Young (withdrawn)

* cited by examiner

*Primary Examiner* — Carl Adams
(74) *Attorney, Agent, or Firm* — Fletcher Yoder, P.C.

(57) ABSTRACT

In certain image processing circuitry, pixel burn-in compensation (BIC) circuitry may be disposed prior to a frame-delayed current control circuitry. This may result in inaccurate burn-in compensation, as burn-in compensation is determined based at least in part on the pixel values, which may be adjusted during pixel modification via the frame-delayed current control circuitry. Accordingly, in an embodiment, burn-in compensation may be disposed after the frame-delayed current control circuitry, such that the BIC circuitry calculates burn-in compensation values based on more accurate (e.g., post-pixel modification) pixel values. This is particularly important with respect to the frame-delayed current control circuitry, as the effects of the frame-delayed current control circuitry may remaining visible on screen for several seconds, negatively impacting user experience.

20 Claims, 12 Drawing Sheets

SYSTEMS AND METHODS FOR ADAPTIVE PEAK LUMINANCE CONTROL

CROSS-REFERENCE TO RELATED APPLICATIONS

This application claims priority to U.S. Provisional Application No. 63/699,720, filed Sep. 26, 2024, which is incorporated by reference herein in its entirety.

BACKGROUND

This disclosure relates to peak luminance control for an electronic display to avoid drawing excessive power.

An electronic display draws energy based on the brightness of its display pixels. Indeed, a greater amount of electric energy is consumed to cause display pixels to emit more light and appear brighter. To prevent the electronic display from drawing too much electrical current at any point during operation, the brightness of the display pixels may be limited and the display pixels may be made dimmer at higher brightness levels, meaning that the display pixels may be dimmed by current control circuitry such that the display pixels are dimmer than intended, which may negatively impact user experience. In some cases, the brightness of the display pixels may be limited based on a worst-case scenario corresponding to an image frame in which all of the display pixels are set to the maximum brightness. That is, in order to control overall energy consumption for the electronic display, each individual display pixel may be limited in the "worst-case" approach to a relatively lower maximum brightness value under the assumption that all other display pixels will also utilize the maximum brightness value. However, in actual operation, some or most image frames have fewer than all of the display pixels set to the maximum brightness.

Accordingly, techniques have been developed to dynamically dim the brightness of the display pixels in real time as image data is sent to the electronic display, rather than statically limiting all display pixels to a lower "worst-case" maximum brightness level. While this dynamic approach may allow some display pixels of the electronic display to be brighter than would be allowed under a worst-case scenario static brightness limitation, if too many display pixels in the image frame are set to a high brightness level, subsequent image data of the same frame may be dimmed rapidly in order to conserve power and prevent current overdraw on the electronic display. Moreover, although this dynamic dimming may prevent the electronic display from drawing too much electric current, the rapid change in brightness level of the dimmed pixels could produce an image artifact that is visible from one image frame to the next.

SUMMARY

Numerous electronic devices—including televisions, portable phones, computers, wearable devices, vehicle dashboards, virtual-reality glasses, and more—display images on an electronic display. Certain electronic displays may have pixels that emit light in pulses. The total amount of light emitted in the pulses may be integrated by the human eye over time to produce the perception of a seamless image on the electronic display. An electronic device that houses such an electronic display may power the electronic display with a power source (e.g., a power source controlled by a power management integrated circuit (PMIC)). The power source may provide the electrical power that is used to produce the pulses of light emitted via the pixels.

If the electronic display were to draw excessive electrical power, it could cause the electronic device to malfunction. For example, by drawing excessive electrical power, the electronic device may experience a malfunction that may cause a front-of-screen (FoS) artifact in the electronic display due to supply ripple, panel overheating (e.g., from PMIC), and/or voltage-current (IR) drop. Some systems avoid drawing excessive power by statically limiting the amount of power available to each pixel according to a worst-case scenario in which every pixel is emitting a maximum possible amount of light. While this may prevent the electronic display from drawing excessive power, limiting the peak brightness of the display pixels in this way may reduce the dynamic range of the electronic display and reduce the capability of the electronic display to show high dynamic range (HDR) images.

Image processing circuitry may reduce the appearance of image artifacts under bright display conditions by applying both real-time and frame-delayed peak luminance control of the display pixels for the image to be displayed on the electronic display. The image processing circuitry may have various image processing circuitry such as a real-time submodule, a frame-delayed submodule, and statistics circuitry. The real-time circuitry may perform real-time modeling of on-screen current draw at a line-by-line granularity to determine a projected (e.g., expected) current draw for the image to be displayed, using the modeling results to limit electric current on a line-by-line basis as needed. The frame-delayed circuitry may support content-adaptive tone mapping of subsequent frames to prevent electric current overdraw in a subsequent frame. Each of these submodules may operate based on statistics captured by statistics-collection circuitry. Collectively, the real-time circuitry and the frame-delayed circuitry allow the image processing circuitry to enable high display brightness and reduce the appearance of image artifacts while preventing current overdraw on the electronic display.

In certain image processing circuitry, pixel burn-in compensation (BIC) circuitry may be disposed prior to the frame-delayed circuitry. This may result in inaccurate burn-in compensation, as burn-in compensation is determined based at least in part on the pixel values that are actually programmed onto the electronic display. However, the pixel values may be adjusted during pixel modification via the frame-delayed circuitry. Accordingly, in an embodiment, burn-in compensation may be disposed after the frame-delayed circuitry, such that the BIC circuitry calculates burn-in compensation values based on more accurate (e.g., post-pixel modification) pixel values.

BRIEF DESCRIPTION OF THE DRAWINGS

Various aspects of this disclosure may be better understood upon reading the following detailed description and upon reference to the drawings in which.

DETAILED DESCRIPTION

Figure 1:
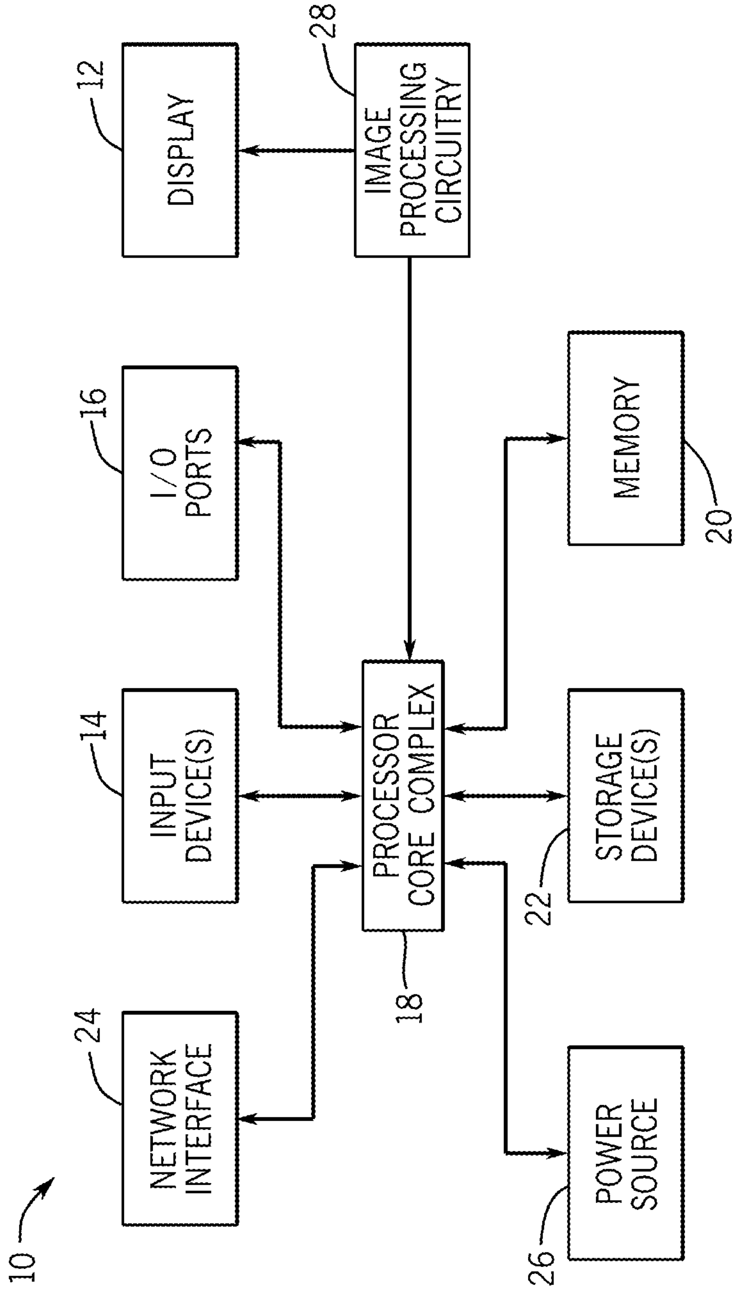
FIG. 1 is a block diagram of an electronic device including an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Image processing circuitry may reduce the appearance of image artifacts under bright display conditions by applying both real-time and frame-delayed peak luminance control. The image processing circuitry may have various image processing circuitry such as a real-time submodule, a frame-delayed submodule, and statistics circuitry. The real-time circuitry may evaluate the image data (e.g., in a frame buffer) to perform real-time modeling of on-screen current draw at a line-by-line granularity to limit electric current on a line-by-line basis. The frame-delayed circuitry may support content-adaptive tone mapping of subsequent frames to prevent electric current overdrawn in a subsequent frame. Each of these submodules may operate based on statistics captured by statistics-collection circuitry. Collectively, the real-time circuitry and the frame-delayed circuitry allow the image processing circuitry to enable high display brightness and reduce the appearance of image artifacts while preventing current overdraw on the electronic display.

The image processing circuitry may also include burn-in compensation (BIC) circuitry. As electronic displays gain increasingly higher resolutions and dynamic ranges, they may also become increasingly more susceptible to image display artifacts due to pixel burn-in. Burn-in is a phenomenon whereby pixels degrade over time owing to the different amount of light that different pixels emit over time. In other words, pixels may age at different rates depending on their relative utilization. For example, pixels used more than others may age more quickly, and thus may gradually emit less light when given the same amount of driving current or voltage values. This may produce undesirable burn-in image artifacts on the electronic display. Thus, without burn-in compensation, burn-in artifacts may be visibly perceived due to non-uniform subpixel aging. To prevent this subpixel aging effect from causing undesirable image artifacts on the electronic display, circuitry and/or software may monitor and/or model the amount of burn-in that is likely to have occurred in the different pixels. Based on the monitored and/or modeled amount of burn-in that is determined to have occurred, the image data may be adjusted before it is sent to the electronic display to reduce or eliminate the appearance of burn-in artifacts on the electronic display.

In certain image processing circuitry, pixel burn-in compensation circuitry may be disposed prior to the frame-delayed circuitry. This may result in inaccurate burn-in compensation, as burn-in compensation is determined based at least in part on the pixel values determined and/or applied during processing via the frame-delayed circuitry. Accordingly, in an embodiment, burn-in compensation may be performed after the frame-delayed circuitry, such that the BIC circuitry calculates burn-in compensation values based on more accurate (e.g., post-pixel modification) pixel values.

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, or the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable gate arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with an array of display pixels. Each display pixel may represent a sub-pixel that controls the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18. Moreover, in some embodiments, the electronic device 10 may include multiple electronic displays 12.

Figure 2:
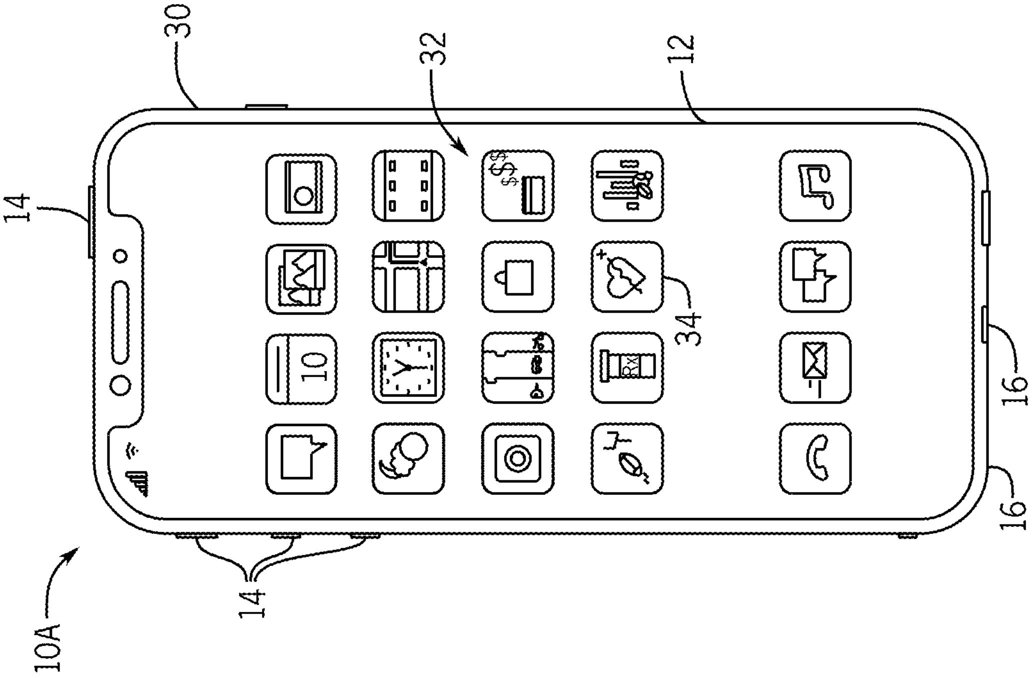
FIG. 2 is an example of the electronic device of FIG. 1 in the form of a handheld device, in accordance with an embodiment.

The electronic device 10 may be any suitable electronic device. One example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30.

Figure 3:
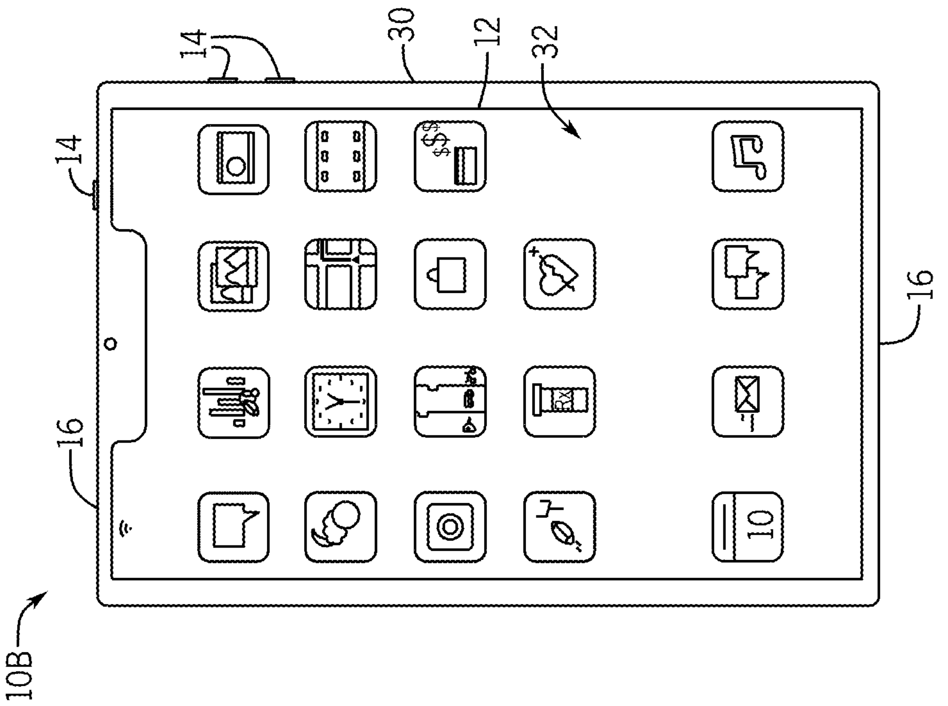
FIG. 3 is another example of the electronic device of FIG. 1 in the form of a tablet device, in accordance with an embodiment.
Figure 4:
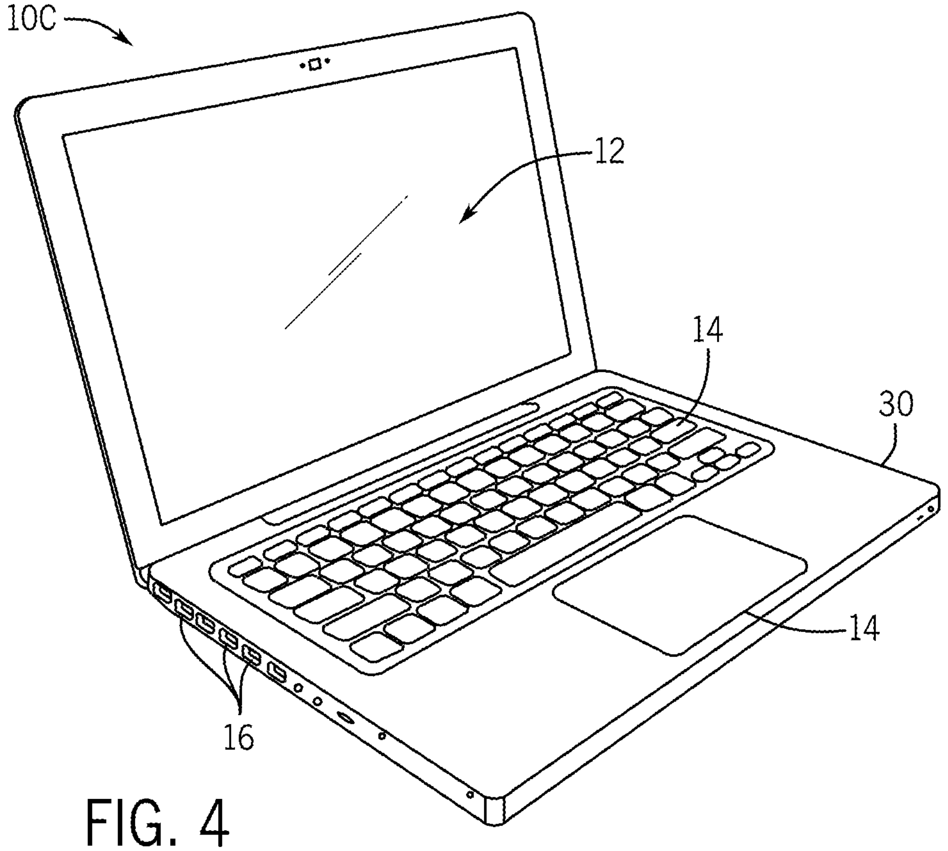
FIG. 4 is another example of the electronic device of FIG. 1 in the form of a notebook computer, in accordance with an embodiment.
Figure 5:
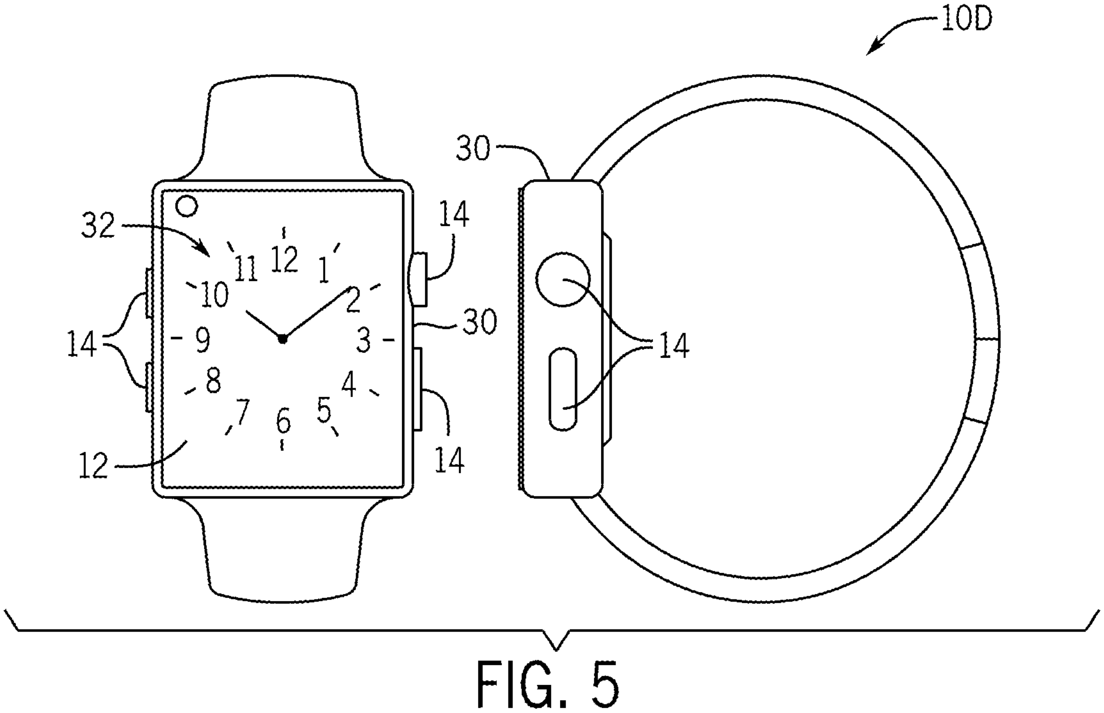
FIG. 5 is another example of the electronic device of FIG. 1 in the form of a wearable device, in accordance with an embodiment.

Another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30.

Figure 6:
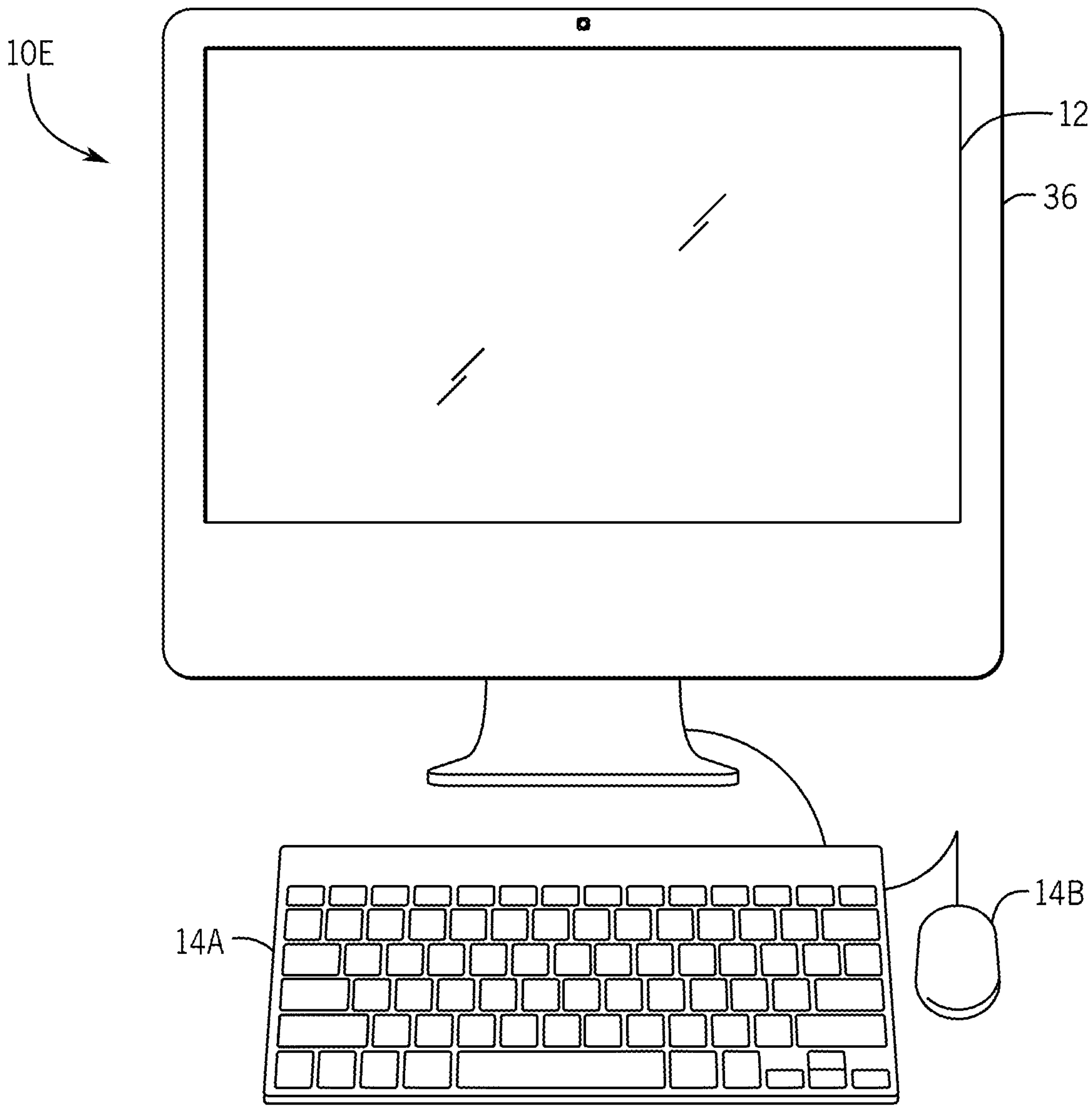
FIG. 6 is another example of the electronic device of FIG. 1 in the form of a front view of a desktop computer, in accordance with an embodiment.
Figure 7:
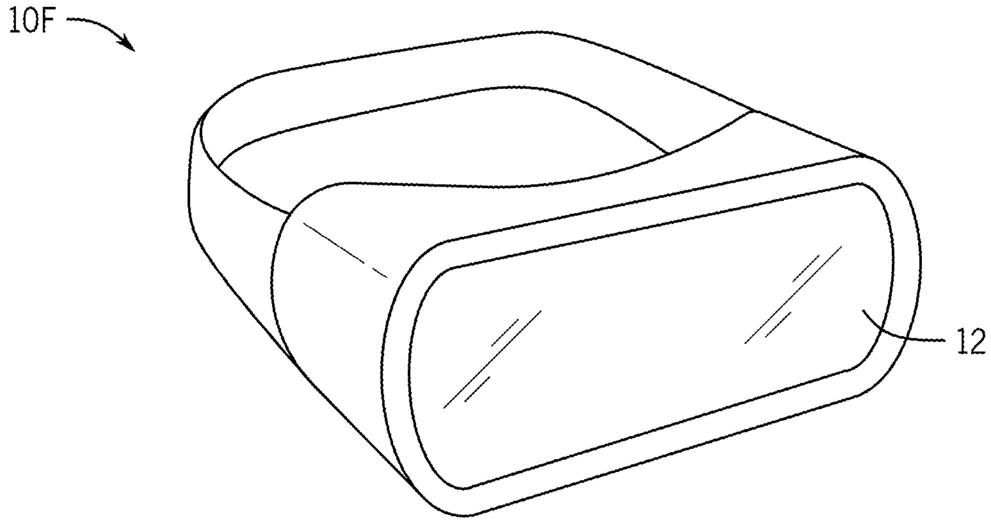
FIG. 7 is another example of the electronic device of FIG. 1 in the form of a wearable headset device, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices, such as the keyboard 14A or mouse 14B (e.g., the input devices 14), which may connect to the computer 10E. The headset 10F of FIG. 7 may represent another embodiment of the electronic device 10 of FIG. 1. The headset 10F may include any wearable headset including any augmented reality (AR) and/or virtual reality (VR) headset. By way of example, the headset 10F may be an Apple Vision Pro™ or other similar device by Apple Inc. of Cupertino, California, though it should be noted that the headset 10F may represent a wearable headset of another manufacturer. The headset 10F may include the electronic display 12, which may include any AR or VR display.

Figure 8:
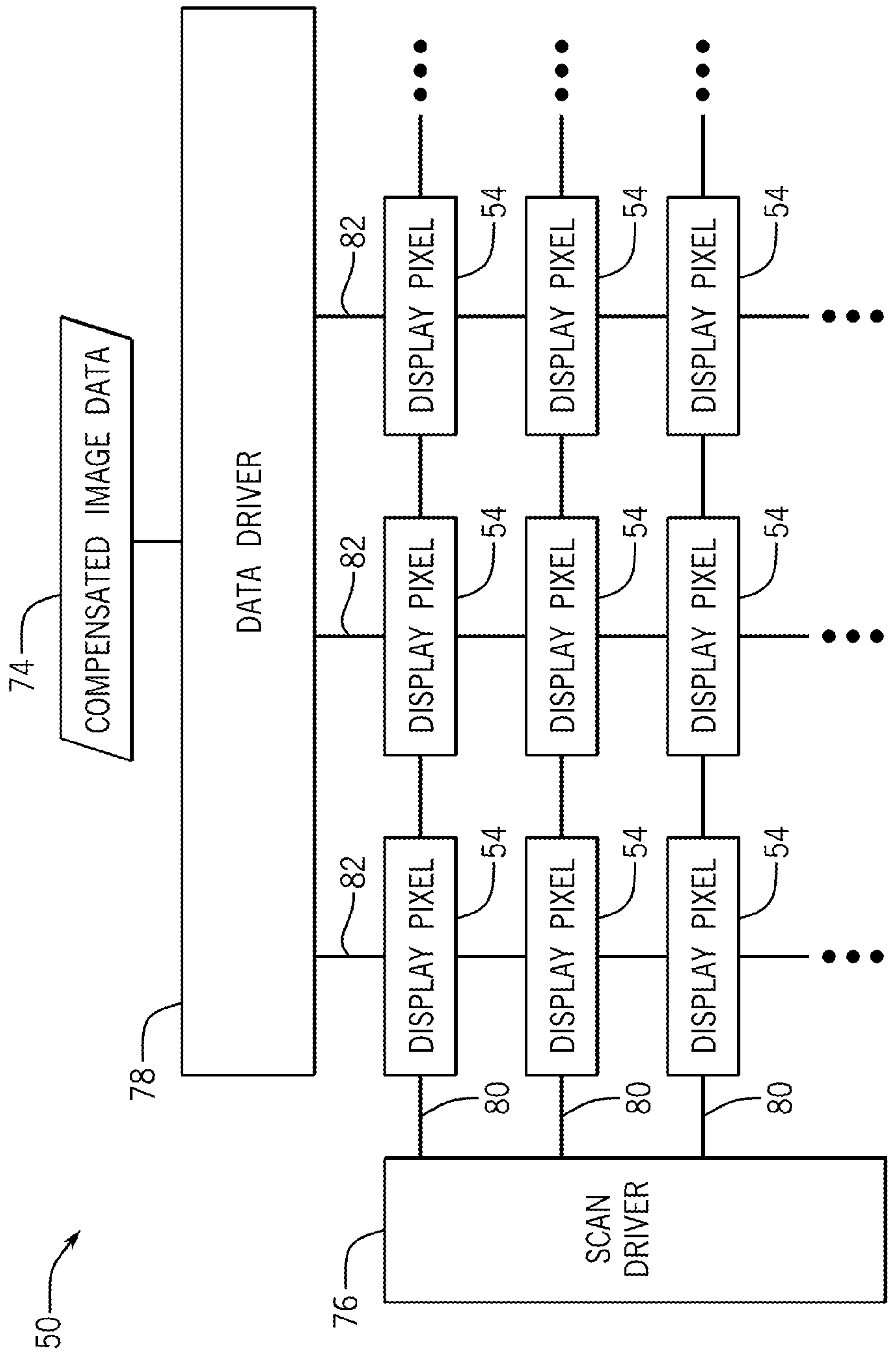
FIG. 8 depicts a block diagram of a display pixel array of the electronic display of FIG. 1, in accordance with an embodiment.

Keeping the foregoing in mind, FIG. 8 is a block diagram of a display pixel array 50 of the electronic display 12. It should be understood that, in an actual implementation, additional or fewer components may be included in the display pixel array 50. The electronic display 12 may receive image data 74 for presentation on the electronic display 12. The electronic display 12 includes display driver circuitry that includes scan driver circuitry 76 and data driver circuitry 78. The display driver circuitry controls programing the image data 74 into the display pixels 54 for presentation of an image frame via light emitted according to each respective bit of image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)), however other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red (R) light, some may emit green (G) light, and some may emit blue (B) light. The display pixels 54 may be driven by a Display Driver Integrated Circuit (DDIC) to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), or others.

The scan driver circuitry 76 may provide scan signals (e.g., pixel reset, data enable, on-bias stress) on scan lines 80 to control the display pixels 54 by row. For example, the scan driver circuitry 76 may cause a row of the display pixels 54 to become enabled to receive a portion of the image data 74 from data lines 82 from the data driver circuitry 78. In this way, an image frame of image data 74 may be programmed onto the display pixels 54 row by row. Other examples of the electronic display 12 may program the display pixels 54 in groups other than by row. In some cases, touch scanning operations may occur while drivers are off or idle (e.g., quiet).

Image data may be processed through image processing circuitry (e.g., a display pipeline) before it reaches the electronic display 12. The image processing circuitry performs a number of operations to improve the appearance of the image data on the electronic display 12. However, it is advantageous for the image processing circuitry to include peak luminance control circuitry that may prevent the electronic display 12 from drawing current above an amount capable of being supported by the power supply. Drawing current in excess of the power supply limit may damage the power supply (e.g., the PMIC). The image processing circuitry may include frame-delayed current control (e.g., peak luminance control) circuitry and real-time current control (e.g., peak luminance control) circuitry. The frame-delayed current control circuitry may scale down the luminance (e.g., intensity) of the image data over several frames, while the real-time current control circuitry may act as a safety cutoff that will stop image data from being displayed for the remainder of a given frame if the real-time current control circuitry determines that displaying the image data for the entire frame will (or is likely to) overdraw the PMIC. In this manner, the frame-delayed current control circuitry, the BIC circuitry, and the real-time current control circuitry may operate to improve the appearance of image data displayed on the electronic display 12 while preventing current over-draw on the power supply.

Figure 9:
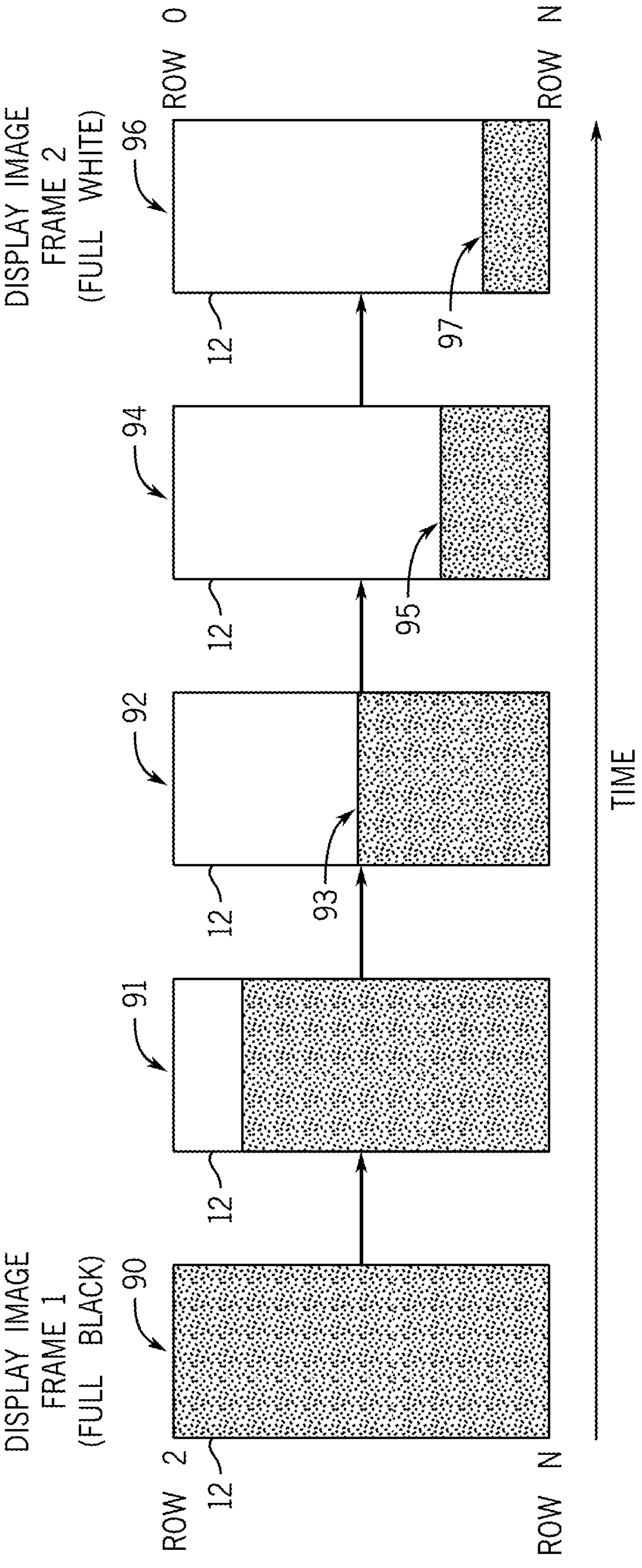
FIG. 9 is an example of peak luminance control that may be performed by real-time current control circuitry, in accordance with an embodiment.

With the foregoing in mind, FIG. 9 illustrates one example of peak luminance control (e.g., real-time luminance scaling, sometimes referred to as dynamic luminance scaling) that may be performed in real-time current control circuitry. As used herein, "real-time" and "dynamic" luminance scaling refers to luminance scaling that may occur instantaneously or near-instantaneously. For example, real-time luminance scaling may occur within one frame of image data. Here, the image frame changes from a fully black image frame 1 (e.g., no light is emitted) to a fully white image frame 2 at a maximum global display brightness value. If the fully white image frame 2 were programmed into the display without modification, all display pixels would be emitting maximum light, potentially drawing excessive power from the power supply. Since the content of the new image frame is not known in advance, intra-frame luminance scaling in the real-time current control circuitry of the electronic device 10 may begin to scale the image data as the total instantaneous luminance increases past some threshold value.

The example of FIG. 9 takes place during one refresh of the electronic display 12 in which image data for a current frame (image frame 2) is programmed over the image data for a previous frame (image frame 1). At a time 90, all of the pixels of the electronic display 12 from Row 0 to Row N are programmed to display black (e.g., not emitting light). The electronic display 12 is refreshed with new image data row by row, and by a time 91, several rows have been programmed with image data to produce white. For example, the red, green, and blue display pixels of those rows may be programmed at full brightness, resulting in the appearance of white on those rows of the electronic display 12. As more rows of the display pixels are programmed to high brightness values, however, it becomes more likely that the electronic display 12 may approach the instantaneous limit of power that can be supplied by the power supply. As such, at a time 92, the luminance of the image data programmed into a row 93 of the display pixels may be scaled to reduce light emission. At a time 94, this may continue as the luminance of subsequent rows 95 are scaled further. Finally, at a time 96, the last of the image data may be programmed into the electronic display 12. To avoid drawing too much power, the luminance of some rows 97 of the display pixels may be completely scaled to 0 (e.g., not emitting any light) by real-time current control circuitry. While this could produce a temporary transient artifact in this worst-case scenario, the next frame may be scaled (e.g., via frame-delayed current control circuitry) to a lower global display brightness value that may avoid such instantaneous luminance scaling, and the electronic display 12 has been prevented from drawing excessive power while still able to operate at high brightness.

Figure 10:
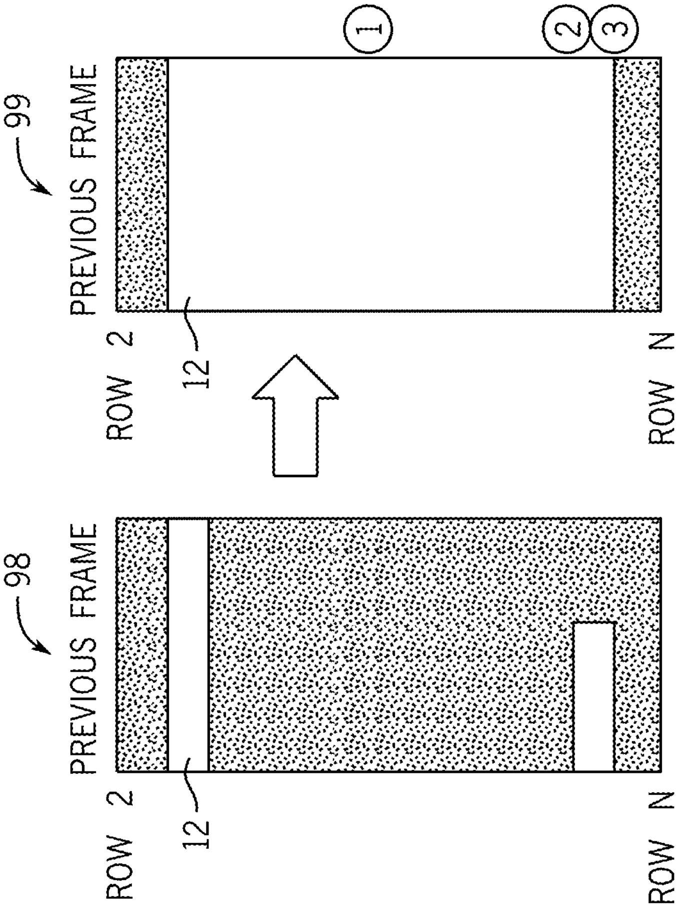
FIG. 10 is another example of peak luminance control that may be performed by real-time current control circuitry, in accordance with an embodiment.

In another example, shown in FIG. 10, a previous frame 98 contains some dark pixels and some bright pixels from Row 0 to Row N. That is, when a current frame 99 begins to be programmed, the total luminance of the electronic display 12 is due entirely to the previous frame 98. Since the first several rows of image data of the current frame 99 programmed into the electronic display 12 are the same as the first several rows of image data of the previous frame 98 that it is replacing, the total pixel luminance initially remains the same. However, for rows where bright pixels of the current frame 99 begin replacing dark pixels from the previous frame 98, the total luminance of the electronic display 12 begins to increase.

Eventually, as more and more rows of display pixels change from dark (previous frame 98) to bright (current frame 99), the total luminance of the electronic display 12 increases to a point where luminance scaling is warranted. This point is labeled “1” in FIG. 10. At point “1,” the total luminance crosses a scaling threshold. The image data is scaled by a given amount beginning at point “1.” Initially, the luminance scaling is relatively moderate, but the luminance scaling may become more severe as the total luminance approaches the maximum total luminance that may be supported by the PMIC. At point “2,” the image data changes less between the previous frame 98 to the current frame 99. Thus, the amount of scaling may decrease. At point “3,” the image data is the same for both the previous frame 98 and the current frame 99, so the total pixel luminance does not change.

As mentioned above, in certain image processing circuitry, pixel burn-in compensation (BIC) circuitry may be disposed prior to the frame-delayed current control circuitry. This may result in inaccurate burn-in compensation, as burn-in compensation is determined based at least in part on pixel values that may be adjusted during pixel modification (e.g., luminance scaling) via the frame-delayed current control circuitry. Accordingly, in an embodiment, BIC circuitry may be disposed after the frame-delayed current control circuitry, such that the BIC circuitry calculates burn-in compensation values based on more accurate (e.g., post-pixel modification) pixel values. This is particularly important with respect to the frame-delayed current control circuitry, as the effects of the frame-delayed current control circuitry may remaining visible on screen for several seconds, negatively impacting user experience.

Figure 11:
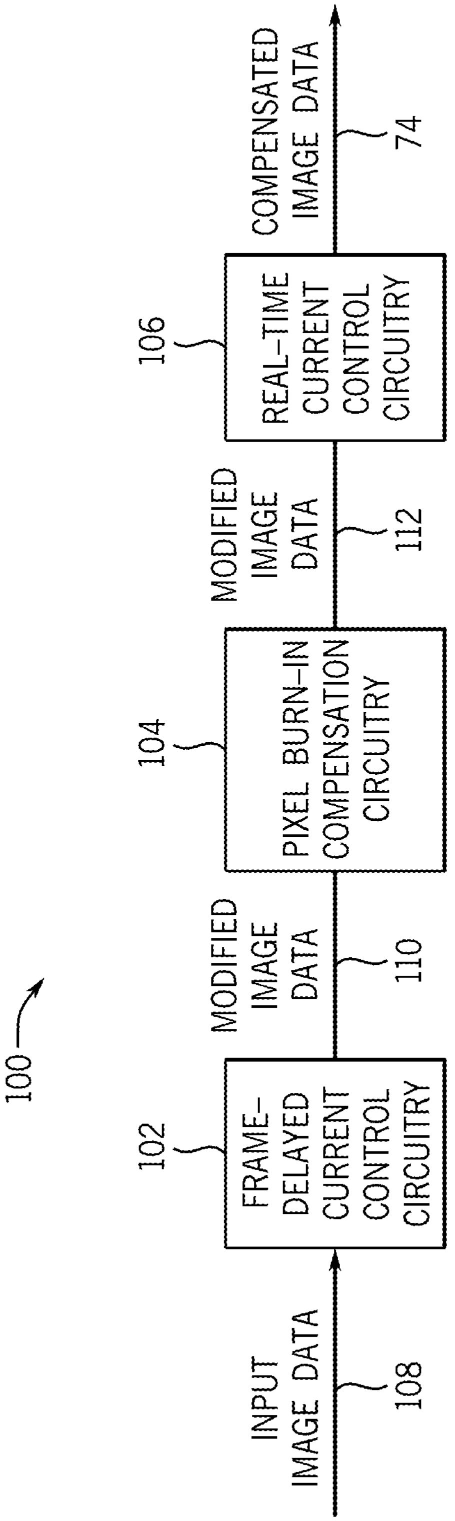
FIG. 11 is a block diagram of image processing circuitry where burn-in compensation (BIC) circuitry is disposed between frame-delayed current control circuitry and real-time current control circuitry to increase the accuracy of burn-in compensation, in accordance with an embodiment.

With the foregoing in mind, FIG. 11 is a block diagram of image processing circuitry 100 that scales the pixel luminance as described with respect to FIGS. 9-10, and wherein BIC circuitry is disposed so as to increase the accuracy of burn-in compensation values. Image processing circuitry 28 includes frame-delayed current control circuitry 102, BIC circuitry 104 coupled to an output of the frame-delayed current control circuitry 102, and real-time current control circuitry 106 coupled to an output of the BIC circuitry 104. As may be observed, input image data 108 may be input into the frame-delayed current control circuitry 102. The input image data 108 may come from processing of previous blocks of a display pipeline. The frame-delayed current control circuitry 102 may scale down (reduce) the brightness of the input image data 108 if the frame-delayed current control circuitry 102 determines that the amount of current drawn by the display pixels 54 when displaying image content on the electronic display 12 will be greater than a maximum amount of current allowed by a power management integrated circuit (PMIC).

The input image data 108 may undergo various image processing procedures within the frame-delayed current control circuitry 102, including pixel modification, which may include scaling down the brightness displayed by the display pixels 54. For example, the frame-delayed current control circuitry 102 may cause some or all of the image data associated with the display content to be reduced in brightness (e.g., gray level) via instruction from software and/or based on image statistics from one or more previous image frames. The frame-delayed current control circuitry 102 may gather statistics for the software brightness reduction on a frame-by-frame basis or a multi-frame basis. The frame-delayed current control circuitry 102 may support content-adaptive tone mapping of subsequent frames to prevent PMIC current overdraw for subsequent frames.

The frame-delayed current control circuitry 102 may scale different areas of content on the electronic display 12 in differing degrees. For example, bright parts of high dynamic range (HDR) content may cause the electronic display 12 to draw significantly more power than bright parts of standard dynamic range (SDR) content. As such, in some cases, the frame-delayed current control circuitry 102 may reduce the brightness of HDR content to a greater degree than SDR content. For instance, in some cases, the brightness of SDR content may not be reduced at all while the brightness of HDR content may be reduced enough to prevent the electronic display 12 from overdrawing current. In other examples, the frame-delayed current control circuitry 102 may reduce the brightness of certain dynamic content (e.g., video, gaming content) while the brightness of static content (e.g., user interface elements) may remain substantially untouched, or vice versa.

The frame-delayed current control circuitry 102 may output modified image data 110 to the BIC circuitry 104. The BIC circuitry 104 may perform burn-in compensation on the modified image data 110. In one example, the BIC circuitry 104 may monitor or model a burn-in effect that would be likely to occur in the electronic display as a result of the image data that is sent to the electronic display. Additionally or alternatively, the BIC circuitry 104 may monitor and/or model a burn-in effect that would be likely to occur in the electronic display as a result of the temperature of different parts of the electronic display while the electronic display is operating. By monitoring and/or modeling the amount of burn-in that has likely taken place in the electronic display, burn-in gain maps may be derived to compensate for the burn-in effects. Namely, the burn-in gain maps may gain down image data that will be sent to the less-aged pixels (which would otherwise appear brighter) without gaining down the image data that will be sent to the pixels with the greatest amount of aging (which would otherwise appear darker). The gained down image data generated by the BIC circuitry 104 may be output to the real-time current control circuitry 106 as the second modified image data 112. In this way, the pixels of the electronic display that have suffered the greatest amount of aging will appear to be equally as bright as the pixels that have suffered the least amount of aging. As such, perceivable burn-in artifacts on the electronic display due to pixel burn-in may be reduced or eliminated.

The BIC circuitry 104 may output second modified image data 112 to the real-time current control circuitry 106. The real-time current control circuitry 106 may perform various image processing procedures including an additional stage of pixel modification. For example, the real-time current control circuitry 106 may scale down display pixels 77 on a row-by-row granularity. The real-time current control circuitry 106 may further scale down the brightness of the display pixels 54 (e.g., through a software adjustment to the image data) if the real-time current control circuitry 106 determines that the current drawn by the display pixels 54 would exceed the PMIC current limit for the presently-displayed image frame. For example, if the real-time current control circuitry 106 determines that the current drawn by the display pixels 54 will exceed the PMIC current limit within a given frame, the real-time current control circuitry 106 may prevent the display pixels 54 from emitting for the remainder of the frame, such that the remainder of the frame is entirely black.

That is, the frame-delayed current control circuitry 102 may scale down luminance of the display pixels 54 for a number of frames to reduce the current drawn by the display pixels 54 and maintain uniform brightness across the electronic display 12 to reduce current drawn without impacting the display content. The real-time current control circuitry 106 may operate as a cutoff switch if the scaling down performed in the pixel modification of the frame-delayed current control circuitry 102 is not sufficient to prevent PMIC current overdraw for a given frame. The real-time current control circuitry 106 may additionally or alternatively perform additional pixel modification on the input image data 108 and output the compensated image data 74. The various image processing stages and pixel modifications will be discussed in greater detail in FIG. 12 below.

Figure 12:
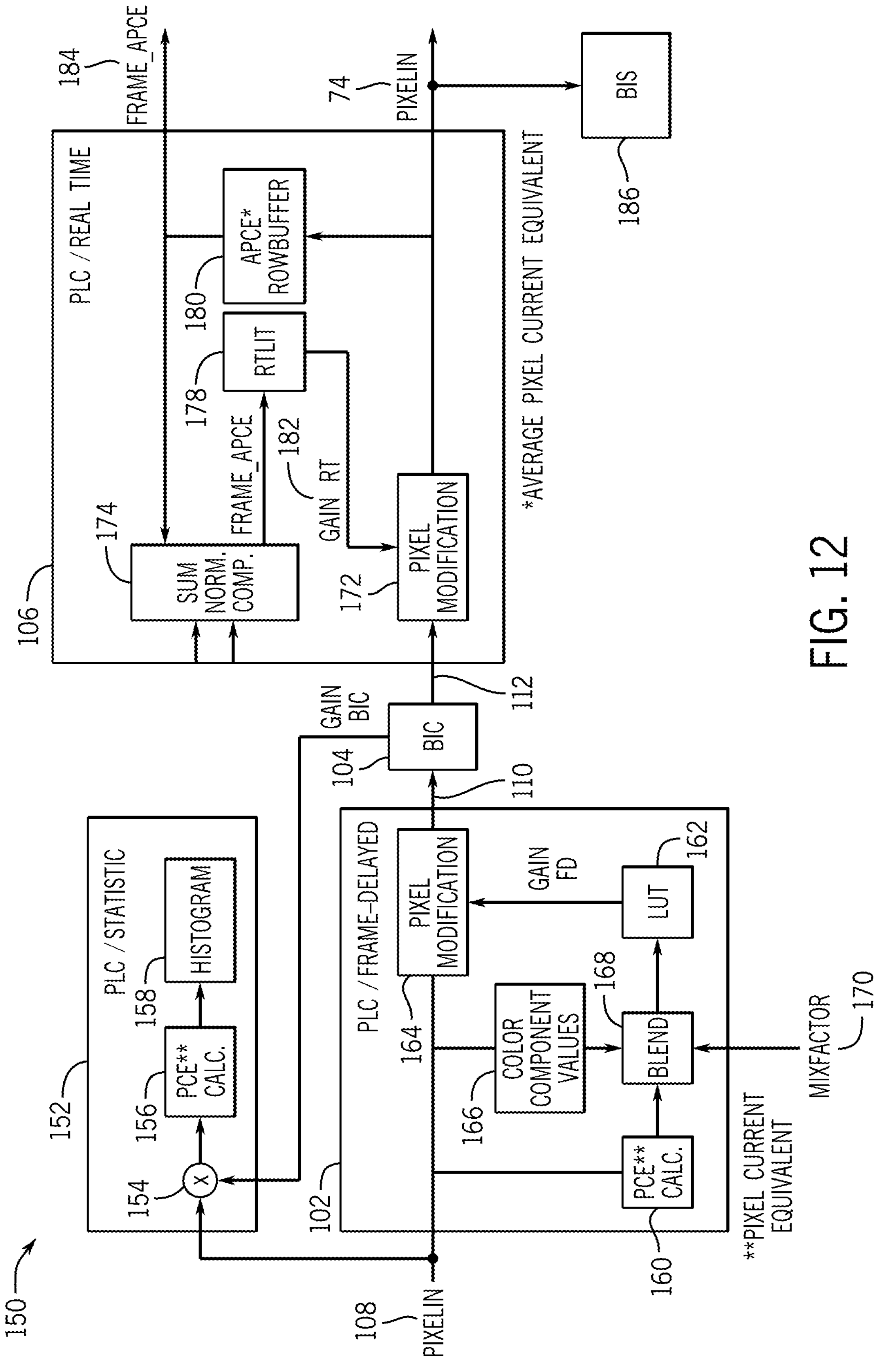
FIG. 12 is a schematic diagram of the image processing circuitry described with respect to FIG. 9, in accordance with an embodiment.

FIG. 12 is a detailed schematic diagram of the image processing circuitry described with respect to FIG. 11, according to embodiments of the present disclosure. The image processing circuitry 150 includes the frame-delayed current control circuitry 102, the BIC circuitry 104, and the real-time current control circuitry 106 as described with respect to the image processing circuitry 28 of FIG. 11, and it should be noted that these elements may operate as described with respect to FIG. 11. The image processing circuitry 150 includes statistics collecting circuitry 152 that may collect pixel current equivalent (PCE) statistics affected by the burn-in compensation but not by the frame-delayed current control circuitry. Pixels of the input image data 108 for each color component are multiplied by GainBIC to determine PCE. The statistics collecting circuitry 152 may use the PCE statistics to generate histograms representing time-series data pertaining to PCE values. PCE is an estimate of current that would be drawn by the electronic display 12 if given image data were programmed into a display pixel 54. In this manner, PCE may be used by the image processing circuitry 150 to determine if current to be drawn by the electronic display 12 may exceed a current limit of a power supply (e.g., PMIC). The statistics collecting circuitry 152 includes combiner circuitry 154 (e.g., multiplication circuitry), PCE calculation circuitry 156, and histogram generation circuitry 158. The input image data 108 may be supplied to both the statistics collecting circuitry 152 and the frame-delayed current control circuitry 102.

With respect to the frame-delayed current control circuitry 102, the input image data 108 may be used as an input to determine PCE in the PCE calculation circuitry 160. The PCE values output from the PCE calculation circuitry 160 may be supplied as inputs to a gain LUT 162. A PCE value output from the PCE calculation circuitry 160 may be combined with a color component value 166. The color component values 166 may include red (R), green (G), or blue (B) values associated with the input image data 108. The color component value 166 may represent maximum RGB values of the input image data 108. The color component value 166 may be combined with the PCE value at blend circuitry 168 based on a mix factor 170. The mix factor 170 may determine the ratio of PCE and color component value. For example, a lower mix factor 170 (e.g., 0) may cause an unmixed PCE value to be output to the gain LUT 162. A greater mix factor 170 (e.g., 1) may cause a PCE value mixed with a maximum color component value (e.g., max R, max G, or max B) to be output to the gain LUT 162. Based on the PCE values or the combination of the PCE values and the color component values 166, the gain LUT 162 may output frame-delayed gain values to pixel modification circuitry 164. Based on the gain LUT values output by the gain LUT 162, the pixel modification circuitry 164 may modify the input image data 108 to generate the modified image data 110. The modified image data is output to the BIC circuitry 104 to compensate the modified image data 110 such that burn-in associated with the display pixels 54 is reduced or mitigated.

Returning to the statistics collecting circuitry 152, it may be observed that the burn-in compensation values are output to the combiner circuitry 154 where the burn-in compensation values are combined with the input image data 108 to generate image data that is compensated for burn-in but not affected by the frame-delayed current control circuitry 102. The burn-in compensated image data is provided to PCE calculation circuitry 156 to determine PCE values. It should be noted that the PCE values associated with the PCE calculation circuitry 156 may be different than the PCE values associated with the PCE calculation circuitry 160, as the PCE calculation circuitry 156 calculates PCE values based on the input image data 108 and burn-in compensation values associated with the BIC circuitry 104. The PCE calculation circuitry 160 does not determine PCE values based on burn-in compensation values, but only the input image data 108. Histogram generation circuitry 158 may generate PCE histograms illustrating time-series data associated with the PCE values. The PCE histograms may be stored in hardware in a read-only memory. The frame-delayed gain values of the gain LUT 162 may be determined based on the PCE histograms.

Turning to the real-time control operations, the real-time current control circuitry 106 includes real-time pixel modification circuitry 172, normalization circuitry 174, a real-time LUT (RTLUT) 178, and an average pixel current equivalent (APCE) row buffer 180. The real-time current control circuitry 106 may receive the modified image data 112. The modified image data 112 may be modified by the frame-delayed current control circuitry 102 and be compensated for burn-in via the BIC circuitry 104. In the real-time current control circuitry 106, the modified image data 112 may be further modified by the real-time pixel modification circuitry 172. The real-time pixel modification circuitry 172 may modify the pixels (e.g., a given row of the display pixels 54) based on a real-time gain 182. The real-time gain 182 may be determined based on frame APCE 184, as will be discussed below.

The real-time current control circuitry 106 may receive frame APCE 184, wherein the frame APCE 184 is the average of the pixel values in the linear domain, and wherein the contributions to the APCE value are at a line granularity. The frame APCE 184 value may include APCE associated with display content of the present frame and/or a previous frame. The frame APCE 184 may be normalized at the normalization circuitry 174. The frame APCE 184 may be supplied to the RTLUT 178. The RTLUT 178 may output the real-time gain 182 based on the frame APCE 184. The modified image data 112, after undergoing pixel modification via the real-time pixel modification circuitry 172, may be output from the real-time current control circuitry 106 as the compensated image data 74. The compensated image data 74 may be output to burn-in statistics collecting circuitry 186. The real-time current control circuitry 106 may determine per-row APCE and store the per-row APCE in the APCE row buffer 180. As the operations within the real-time current control circuitry 106 are recursive, the per-row APCE stored in the APCE row buffer 180 may be used in the determination of the frame APCE 184.

In this manner, the image data is compensated such that burn-in associated with the display pixels 54 is reduced or mitigated in a more effective manner based on the pixel modifications performed with respect to the frame-delayed current control circuitry 102. It should be noted that the BIC circuitry 104 may, in some embodiments, be disposed at the output of the real-time current control circuitry 106 to further enhance the accuracy of the burn-in compensation. However, the effects of the real-time current control circuitry 106 only last for one frame, and as such may have a less noticeable impact on a user's viewing experience than the frame-delayed current control circuitry 102, which may impact the displayed content for several seconds.

The image processing circuitry 150 (e.g., via the frame-delayed current control circuitry 102 and/or the real-time current control circuitry 106) may modify high dynamic range (HDR) image data differently than standard dynamic range (SDR) image data. SDR and HDR content may coexist onscreen together. In some instances, SDR content may generally be able to be supported with full brightness (e.g., up to 1,000 nits) over the entire display panel without overdrawing the PMIC. The pixels for HDR content may describe brighter content (e.g., up to 1,600 nits), but only 75% of the display panel may display the HDR content at full brightness before the PMIC is overdrawn. Accordingly, if the image processing circuitry 150, either through the frame-delayed current control circuitry 102 or the real-time current control circuitry 106, determines that the image data is to be scaled down to prevent PMIC overdraw, the image processing circuitry 150 may dim only the HDR content, while leaving the SDR content alone. This enables the image processing circuitry 150 to reduce the current load on the PMIC while maintaining brightness and image quality for a portion of the display panel (e.g., corresponding to the SDR content).

Figure 13:
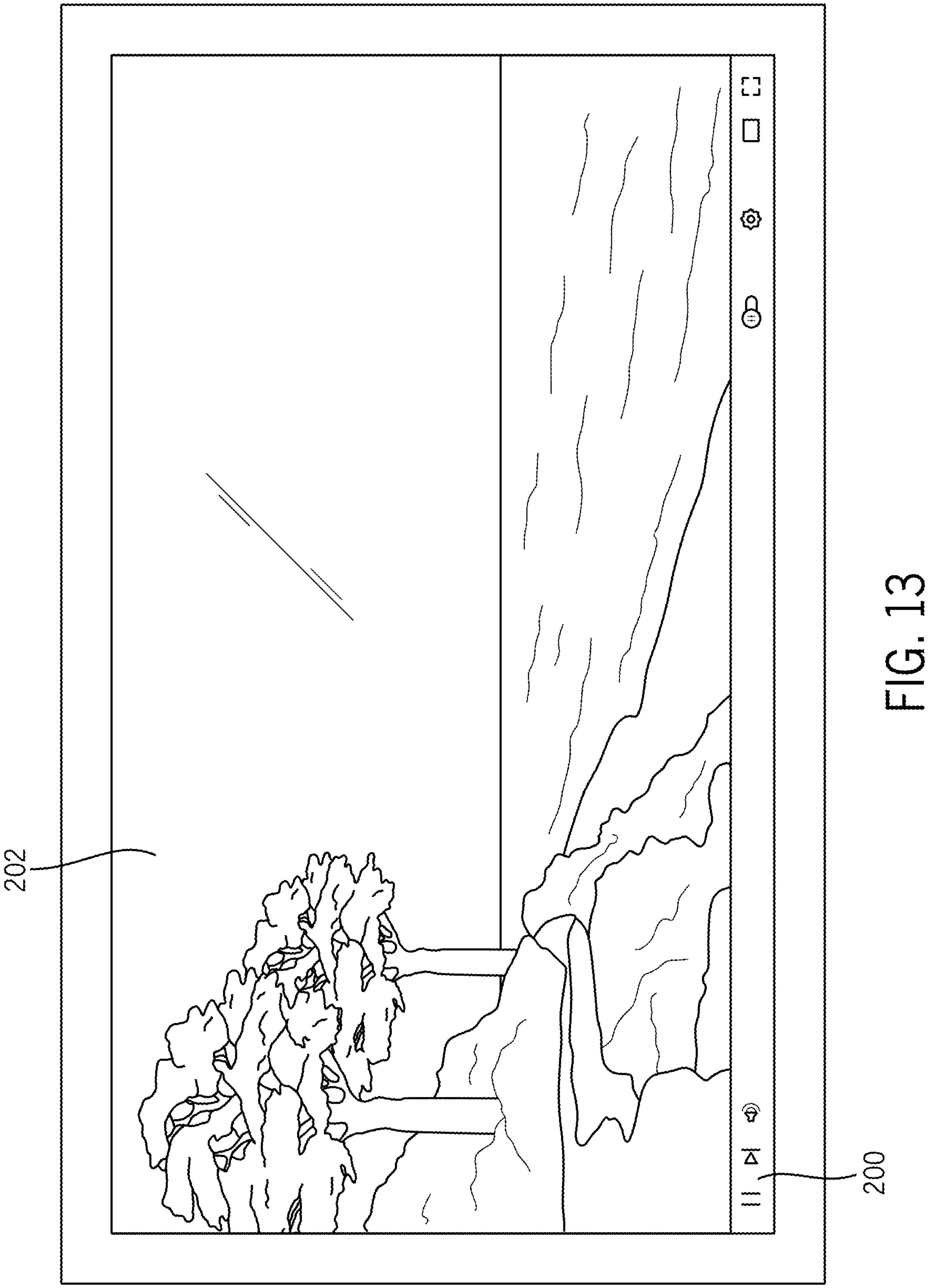
FIG. 13 is an example of high dynamic range (HDR) and standard dynamic range (SDR) content simultaneously displayed on an electronic display.
Figure 14:
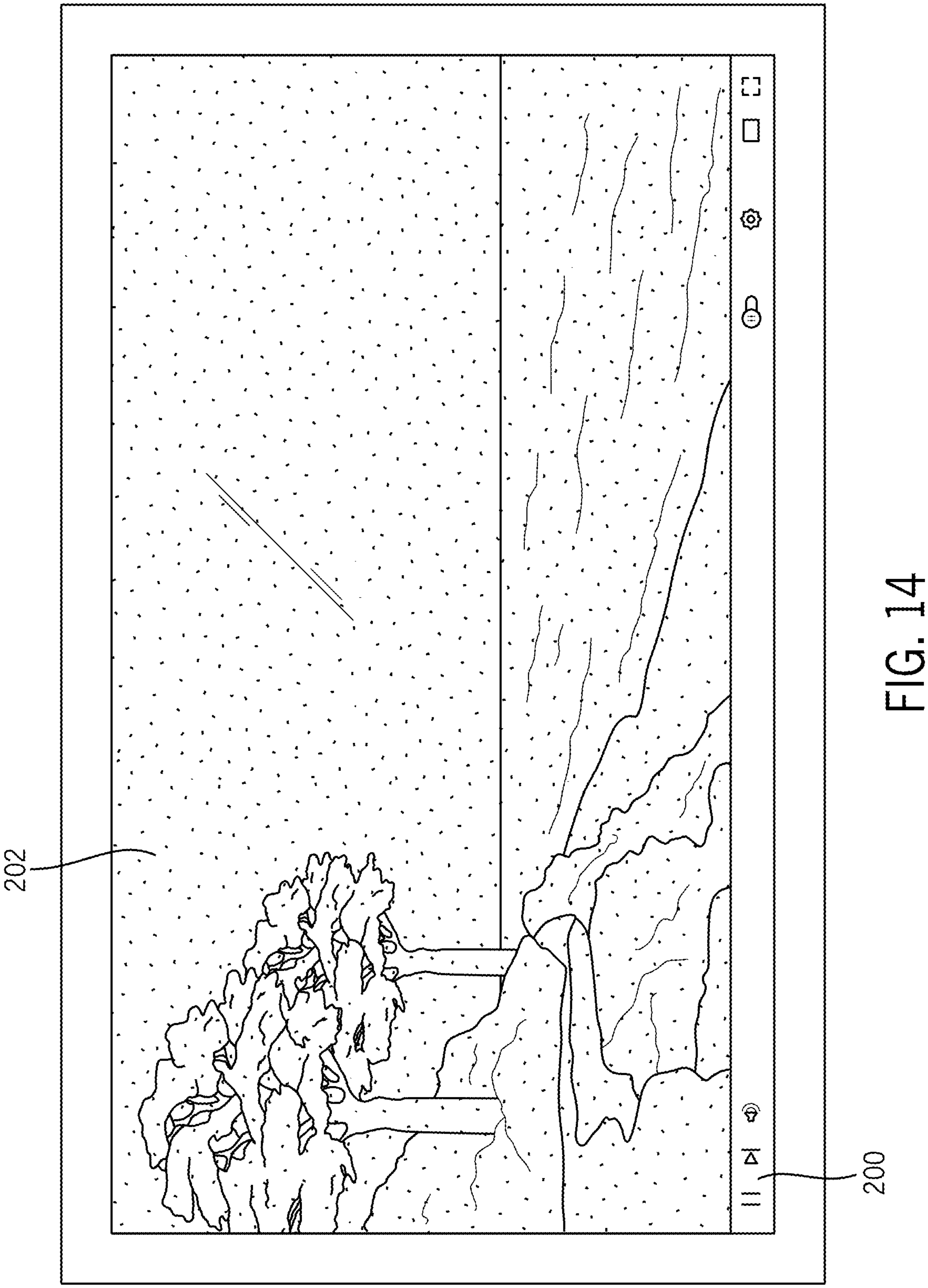
FIG. 14 is an example of image processing circuitry scaling down the luminance of the HDR content while the SDR content remains unaffected, in accordance with an embodiment.

FIG. 13 illustrates an example of SDR content 200 and HDR content 202 that may be displayed on the electronic display 12. The HDR content 202 may cause the electronic display 12 to draw excessive current while displaying content with high brightness values. However, the SDR content 200 may draw considerably less current. Accordingly, the image processing circuitry 150 may cause luminance of the display pixels 54 displaying the HDR content 202 to be scaled down, while leaving the SDR content 200 alone (e.g., not scaling down the SDR content 200). FIG. 14 illustrates the content of FIG. 13 with the luminance of the HDR content 202 scaled down. By scaling down only the HDR content 202 displayed on the electronic display 12, the image processing circuitry 150 may reduce the current load on the PMIC while maintaining brightness and image quality for the SDR content 200.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:

an electronic display configured to drive a plurality of pixels; and image processing circuitry comprising:

current control circuitry configured to determine current to be drawn or projected to be drawn by the electronic display at a line-by-line granularity and to adjust image data to prevent current overdraw;

frame-delayed current control circuitry configured to perform content-adaptive tone mapping of subsequent frames to prevent current overdraw for the subsequent frames at least in part by performing the content-adaptive tone mapping for high dynamic range (HDR) content independent of standard dynamic range (SDR) content; and burn-in compensation circuitry coupled to an output of the frame-delayed current control circuitry and coupled to an input of the current control circuitry.

2. The electronic device of claim 1, comprising statistics circuitry coupled to an input of the frame-delayed current control circuitry and an output of the burn-in compensation circuitry.

3. The electronic device of claim 2, wherein the statistics circuitry is configured to receive input image data and determine pixel current equivalent values based on the input image data and a burn-in compensation applied by the burn-in compensation circuitry.

4. The electronic device of claim 3, wherein the statistics circuitry is configured to determine histograms based on the determined pixel current equivalent values.

5. The electronic device of claim 1, wherein the burn-in compensation circuitry is configured to apply a burn-in compensation to input image data modified via the frame-delayed current control circuitry.

6. The electronic device of claim 1, wherein the frame-delayed current control circuitry is configured to determine pixel current equivalent values based on input image data.

7. The electronic device of claim 6, wherein the frame-delayed current control circuitry is configured to apply a pixel modification to input image data based on the determined pixel current equivalent values and color component values associated with the input image data.

8. The electronic device of claim 1, wherein the current control circuitry is configured to:

receive modified input image data modified by the frame-delayed current control circuitry and compensated for burn-in by the burn-in compensation circuitry; and apply an additional real-time modification to the modified input image data to generate compensated image data.

9. The electronic device of claim 8, wherein the current control circuitry is configured to output the compensated image data to burn-in statistics collecting circuitry.

10. The electronic device of claim 1, wherein the current control circuitry is configured to provide compensated image data for driving of the plurality of pixels.

11. A method comprising:

receiving input image data at first current control circuitry;

generating modified input image data at least in part by modifying, via the first current control circuitry, a first portion of the input image data independent of a second portion of the input image data, wherein the first portion corresponds to standard dynamic range (SDR) content of a frame of image content, and wherein the second portion corresponds to high dynamic range (HDR) content of the frame of image content; and performing, via burn-in compensation circuitry, burn-in compensation on the modified input image data to generate burn-in compensated input image data.

12. The method of claim 11, comprising sending the burn-in compensated input image data to second current control circuitry.

13. The method of claim 12, wherein the first current control circuitry comprises frame-delayed current control circuitry and the second current control circuitry comprises real-time current control circuitry.

14. The method of claim 12, wherein the second current control circuitry is configured to determine current drawn by an electronic display at a line-by-line granularity and adjust image data to prevent current overdraw.

15. The method of claim 11, wherein the first current control circuitry is configured to perform content-adaptive tone mapping to prevent electric current overdraw for subsequent frames of content.

16. The method of claim 11, comprising:

receiving, at statistics collecting circuitry, the input image data and a burn-in compensation value from the burn-in compensation circuitry; and generating pixel current equivalent histograms based at least partially on the input image data and the burn-in compensation value.

17. The method of claim 11, wherein receiving the input image data at the first current control circuitry comprises receiving, at the first current control circuitry, the input image data comprising data to present a graphical user interface (GUI), an application interface, text, a still image, video content, or any combination thereof.

18. A tangible, non-transitory, computer-readable medium, comprising instructions configured to, when executed, cause one or more processors to:

instruct frame-delayed current control circuitry to apply a pixel modification to input image data to generate modified input image data at least in part by modifying a first portion of the input image data independent of a second portion of the input image data, wherein the first portion corresponds to standard dynamic range (SDR) content, and wherein the second portion corresponds to high dynamic range (HDR) content;

instruct the frame-delayed current control circuitry to send the modified input image data to burn-in compensation circuitry; and instruct the burn-in compensation circuitry to compensate the modified input image data based on the pixel modification applied by the frame-delayed current control circuitry.

19. The tangible, non-transitory, computer-readable medium of claim 18, wherein the instructions, when executed, cause the one or more processors to cause real-time current control circuitry to receive burn-in compensated input image data from the burn-in compensation circuitry and to perform pixel modification on the burn-in compensated input image data.

20. The tangible, non-transitory, computer-readable medium of claim 17, wherein the instructions, when executed, cause the one or more processors to cause statistics collecting circuitry to generate a set of pixel current equivalent histograms based on the input image data and a burn-in compensation value.

* * * * *